March 5, 1957 C. E. HUFFMAN 2,784,341

CONTROL SIGNALS FOR SEQUENTIAL COLOR TELEVISION

Filed Dec. 2, 1947

INVENTOR
Charles E. Huffman

BY Charles W. Mortimer
ATTORNEY

United States Patent Office 2,784,341
Patented Mar. 5, 1957

2,784,341

CONTROL SIGNALS FOR SEQUENTIAL COLOR TELEVISION

Charles E. Huffman, Upper Montclair, N. J., assignor to Allen B. Du Mont Laboratories, Inc., Passaic, N. J., a corporation of Delaware Application December 2, 1947, Serial No. 789,296

11 Claims. (Cl. 315—21)

This invention relates to color television. It relates more particularly to a color television system in which a cathode-ray beam is caused to scan lines on a screen that covers the scanned area, to produce different colors in accordance with positions of the beam. The lines are in groups, each group containing a line of each color.

In 2:1 interlaced scanning, for example, the cathode-ray beam is caused to scan the screen by scanning in sequence all the odd lines of one color field, then all the even lines of another color field, then all the odd lines of a third color field, then all the even lines of the first color field, then all the odd lines of the second color field, and then all the even lines of the third color field, and so on. Thus, all six fields add up to make three complete color frames or one complete picture frame. This is repeated for each frame.

With this invention, if the cathode-ray beam departs from an intended line and scans a line of the wrong color a correcting signal is produced as the beam traverses the control area. This signal is utilized to return the beam to its correct path.

The invention may be understood from the description in connection with the accompanying drawings in which.

Figure 1:
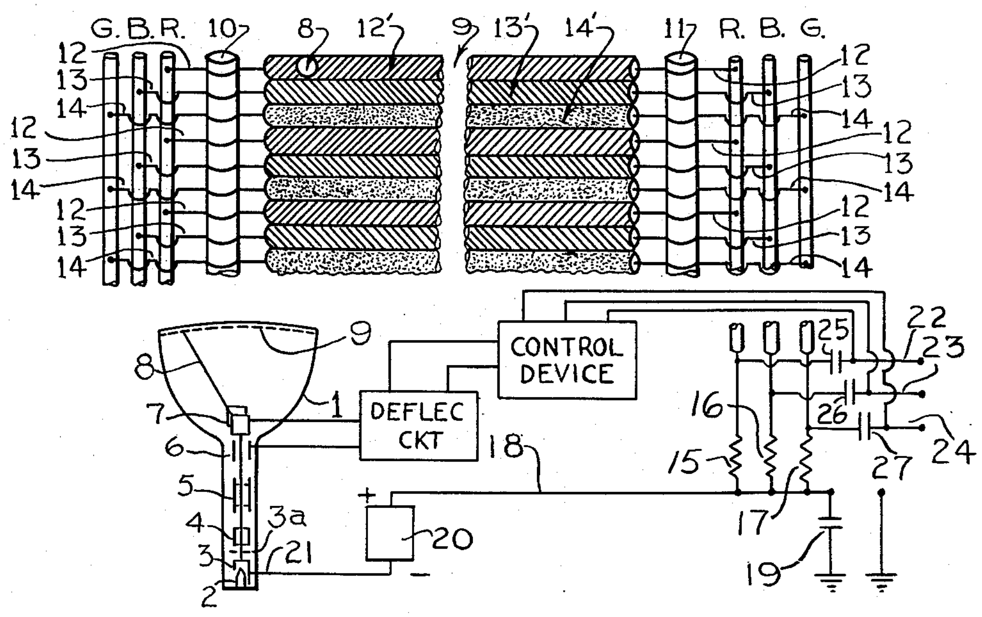
Fig. 1 is a diagram illustrating an embodiment of the invention, parts being broken away.

In Fig. 1 of the drawing, reference character 1 indicates a cathode-ray tube that is provided with a heater 2, cathode 3, control grid 3*a*, first and second anodes 4 and 5, horizontal and vertical deflecting plates 6 and 7. The cathode-ray beam 8 is caused to scan the fluorescent material that is installed along the face 9 of the tube 1. Deflecting coils may be employed in place of the deflecting plates 6 and 7.

Rods 10 and 11 of insulating material partly broken away and shown on a much larger scale than the tube 1, are located inside the tube 1 along its face 9. Sets of conductors 12, 13 and 14 extend across the rods 10 and 11. These conductors have fluorescent material 12', 13' and 14' coated on them intermediate the ends thereof. They lie along lines that are traversed by the beam 8 which is caused to scan the face of the tube 1. The beam 8 is caused by signals applied to the plates 6 and 7 in the known way to scan a group of lines of a field, for instance the odd field, that emits one color which may be red, then a group of lines of another field, which, as a consequence of interlaced scanning, will be even, that emits another color which may be blue, then a group of lines which will be odd that emits a third color which may be green. This completes the scanning of half the lines of a complete frame. Then the even lines of the first color, the odd lines of the second color and the even lines of the third color are scanned, this completing the scanning of one complete frame.

The group of conductors numbered 12 is connected to conductor R, the group of conductors numbered 13 is connected to conductor B, and the group of conductors numbered 14 is connected to conductor G, at one or both ends.

Conductors R, B, G are connected to one of resistors 15, 16 and 17, respectively, across which a voltage is developed when the scanning beam impinges on the conductors 12, 13 or 14 as further explained below.

Lead 18 connects the opposite ends of resistors 15, 16 and 17 in common to the positive terminal of a source 20 of potential. The negative terminal of potential source 20 is connected to cathode 3 of tube 1. During that portion of the horizontal scanning time in which the beam 8 impinges upon the bared portion of one or more conductor, 12, 13 or 14, a circuit is completed through that conductor, its associated conductor R, B or G and resistor 15, 16 or 17, potential source 20, cathode 3, and beam 8. Flow of beam current through resistors 15, 16 and 17 causes a potential change across them in proportion to the amount of beam current intercepted.

Figures 2, 3:
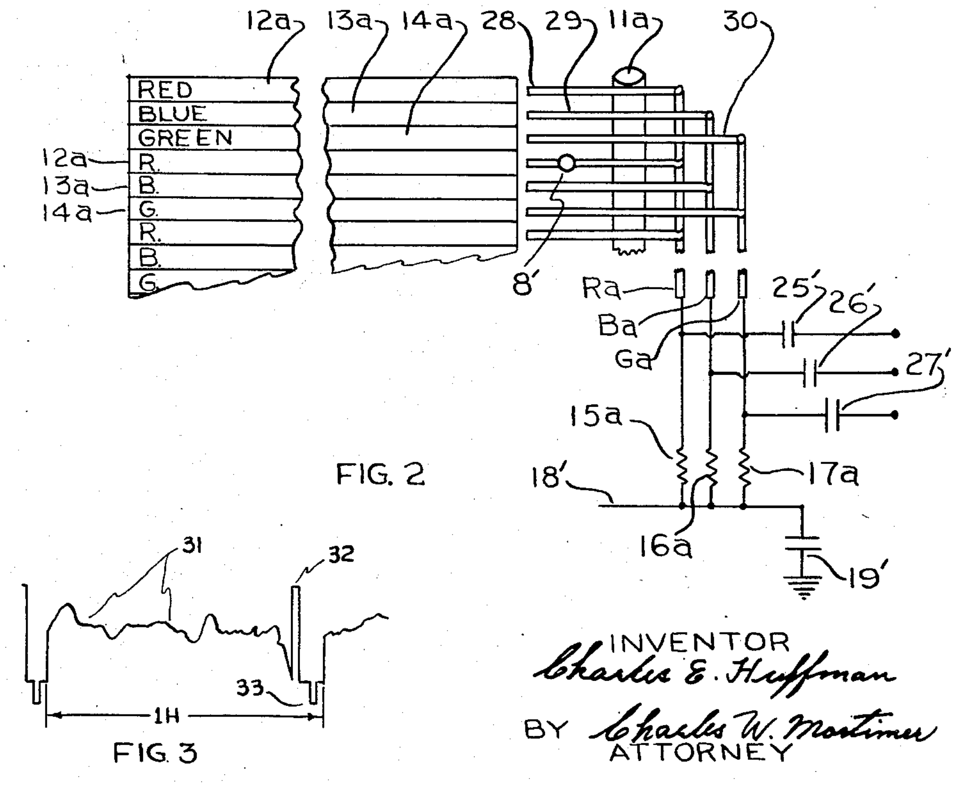
Fig. 2 is a similar view showing a modification.
Fig. 3 is a diagram showing a preferred type of composite video signal which is suitable for use in operating this invention.

In the modification shown in Fig. 2, conductors 28, 29 and 30, function in the same way as the bared portions of conductors 12, 13 and 14 to intercept the scanning beam at the end of the scanning line.

Strips of different color emissive fluorescent materials 12*a*, 13*a* and 14*a* are supported by means other than the conductors 12, 13 and 14, and may be applied for instance directly on the face of tube 1.

Conductors 28 are aligned with strips of color emissive fluorescent material numbered 12*a*; conductors 29 are aligned with strips of color emissive fluorescent material numbered 13*a*; conductors 30 are aligned with strips of color emissive fluorescent material numbered 14*a*; as are conductors 12, 13 and 14 described just above.

These conductors 28, 29 and 30 function in the same way as the bared portions of conductors 12, 13, 14. They need not be embedded in or be in contact with the fluorescent material but may be if desired.

The operation of the device shown in Fig. 1 during the scan of a blue field, for example, is as follows:

As long as the cathode-ray beam 8 correctly scans the line of the fluorescent material numbered 13' it will be centered on conductor 13 when traversing the control area. A signal will be developed across resistor 16 and delivered over lead 23 through condenser 26 to the control device referred to below, but as no correction of the scanning path is required, the control device operates to suppress this signal. When a scanning spot providing overlap is used signals are produced across resistors 15 and 17 by the edges of the beam impinging on conductors 12 and 14. When the beam is centered on conductor 13 equal signals are produced across resistors 15 and 17. After being delivered to the control device over leads 22 and 24 through condensers 25 and 27 the signal developed across resistor 17 is reversed in polarity and opposed to the signal developed across resistor 15. Therefore one signal cancels the other and no correcting signal is produced by the control device so that the scanning path is not altered.

However, if the scanning path of beam 8 is disturbed in some manner and is, for example, displaced toward line 12' thus causing red fluorescent material to emit light, conductor 12 intercepts more of the beam current and conductor 14 less of the beam current as the beam traverses the control area.

The signal resulting across resistor 15 is delivered to the control device over lead 22 through condenser 25. The signal developed across resistor 17 is delivered over lead 24 through condenser 27, to the control device wherein it is reversed in polarity and opposed to the signal developed across resistor 15, this being similar to the action described above. The signal across resistor 15 is the greater of the two and the resulting signal is of the correct polarity to be used by the control device to alter the path of scanning beam 8 in the direction which will return it to the proper place, i. e. centered on line 13′ and conductor 13.

When the scanning spot departs from a path centered on a blue line in such a way as to enter into a green line, for instance, the conductor 14 will intercept more of the beam electrons than conductor 12, as the spot traverses the control area, and the signal resulting on lead 24 will be greater in magnitude than that on lead 22. These signals are opposed in polarity by inverting the signal on lead 24 in the subsequent control circuits. This results in a signal having polarity opposite to that on lead 24 and equal in magnitude to the difference between the magnitude of the two signals.

This resultant is then used to alter the scanning path so as to re-center it on the blue line.

The operation of the modification shown in Fig. 2 is practically the same as that described above. In this modification, as long as the cathode-ray beam 8′ is sweeping the lines 12*a*, 13*a* and 14*a* of the screen 9 correctly, no signal is produced to cause any change in the control device which would vary the scanning by the beam 8′. However, when the beam 8′ departs from the line which it was intended to scan, it strikes another one of the conductors 28, 29 or 30 thereby generating an impulse which is coupled by one of the condensers 25′, 26′ or 27′ to the device mentioned below which applies a correcting pulse which returns the beam 8′ to the correct line.

The video signal shown in Fig. 3 may be used in carrying out this invention. Reference character 31 represents a line of the picture signal, 32 represents a control pulse inserted during horizontal blanking interval just prior to the horizontal synchronizing pulse 33. This control pulse 32 causes the beam current to assume a predetermined value while traversing the control area. Therefore the intensity of beam 8, as it traverses the control area, is the same for each line regardless of picture content so that control signals are produced the potential of which varies with the degree of adherence to the proper scanning path.

This potential change is delivered over leads 22, 23 and 24 through condensers 25, 26 and 27 to a device (such as is shown, for example, in my application, Serial No. 638,799, filed January 3, 1946, entitled "Device for Utilizing Control Signals," now Patent Number 2,530,431, issued Nov. 21, 1950, and entitled "Color Device for Utilizing Control Signals") which utilizes these as control signals to confine the scanning beam 8 within its desired path along the lines 12′, 13′ and 14′.

The operation of this invention may be understood by considering the beam 8 in Fig. 1 while it is scanning the blue fluorescent material 13′, for instance. During this time the scanning path is to be confined to the blue portion of each picture line.

When the electron beam 8 travels along the first blue line and reaches the end of that line it then impinges on the bared portion of conductor 13 resulting in a potential change across resistor 16 as described above. This change in potential is carried through blocking condenser 26 and along lead 23 for use in amplifiers and electronic switches described and explained in the above mentioned application. Blocking condenser 26 serves also to isolate beam accelerating potential 20 from output lead 23.

As the scanning path of the beam progresses from one blue line to the next and as long as it remains centered upon the blue lines only, it will traverse each of the conductors 13 in succession and a series of pulses will be delivered at lead 23.

When the scanning spot is small enough to reduce overlap to a negligible amount conductors 12 and 14 will not intercept enough electrons to produce an appreciable signal and no control signal is produced on conductors 12 and 14 until the scanning spot departs from a path centered on the blue lines.

When the scanning spot is large enough to provide overlap conductors 12 and 14 will intercept some electrons from the edge of the beam. As long as the scanning spot is centered on a blue line conductors 12 and 14 will intercept equal amounts of beam electrons to produce signals of equal amplitude and same polarity.

The operation of the electronic switch or switches in the associated control circuits is such that one of these equal signals is reversed in polarity and opposed to the other, the resultant of which becomes the controlling signal.

It is therefore obvious that the operation of the device does not depend upon the size of the scanning spot or its focus.

It is obvious that the composite signal produced by this device comprises a series of pulses resulting from the signals that are collected among the leads 22, 23 and 24. The amplitude of the pulses vary in accordance with the degree with which the scanning beam is caused to adhere to its correct path.

The operation of the amplifiers and electronic switches referred to is such that the signal delivered to lead 23 during the scanning of a blue field is suppressed and the normal deflection is allowed to continue unaltered for the duration of that field, whereas a signal delivered to lead 22, which increases in amplitude when the scanning path strays into a red line, operates to alter the deflection in such a manner as to return the beam to its predetermined course along the blue lines. Similarly a signal of increased amplitude which is delivered to lead 24 by the beam straying into a green line acts to alter the deflection in the opposite direction, thereby returning it to its predetermined course along the blue lines.

At the end of a blue field, the electronic switches referred to cause changes in the amplifiers which result in the same sort of correction to maintain the scanning path along the color lines of the next succeeding field.

This operation is repeated for each color field in sequence in order to provide complete coverage of the entire frame in each of the primary colors used.

While this invention has been specifically described in connection with three color systems it is not limited thereto as it may be used with systems utilizing a smaller or larger number of colors by decreasing or increasing the number of lines and conductors in accordance with the number of colors to be used.

To insure that a control pulse is generated for each line, the scanning beam is modulated to a predetermined value each time it traverses the control area as mentioned above and described in my application, Serial No. 638,800, filed January 3, 1946, entitled "Device for Obtaining Color Controlling Signals for Television," now Patent No. 2,490,812, issued December 13, 1949, and entitled "Control for Color Television."

Therefore, even though in some parts of the picture a certain color is absent and the beam is blanked in the picture portion of the scan, beam current is present during the traverse of the control area and the scanning is controlled independent of the picture content.

Although one embodiment of the invention and a modification thereof have been described above for use with a fluorescent screen it is apparent that the lines of fluorescent material 13′, 14′ and 15′ do not enter into the generation of the control signals. Therefore the control structure may also be used to control the scanning path over other scanned areas such as, for instance, television camera mosaics, light valve screens or the like.

What is claimed is:

1. A cathode ray tube having a fluorescent screen and a structure of conducting material in substantially the same plane with and at one side of said screen and apparatus for scanning alternately said screen and said structure with an electron beam, said screen comprising a pattern of material producing light in different colors and arranged in rows, and said structure comprising a plurality of conducting elements respectively aligned with each single ones of said rows.

2. A cathode ray tube having a light translating screen, an apparatus to produce and deflect a cathode ray beam for scanning said screen with a plurality of scanning lines and a control area within said tube in substantially the same plane with and adjacent one side of said screen and within the scanning area of said cathode ray beam and comprising a plurality of conductors respectively aligned with said scanning lines and connected to receive current from said beam, and means applying said current to said deflection apparatus to control the line scanning position thereof.

3. In a system for producing color television, a cathode ray tube having a light translating screen, an apparatus to produce and deflect a cathode ray beam scanning said screen with a plurality of scanning lines, said screen having a pattern of material producing light in different colors and arranged in rows to be scanned by said beam within a picture area, and a control area within said tube in substantially the same plane with and adjacent said picture area and within the scanning area of said cathode ray beam and comprising a plurality of conductors respectively aligned with said rows and connected to receive current from said beam, and means applying said current to said deflection apparatus to control the position of consecutive scanning lines thereof independently of the color of said picture.

4. In a cathode ray tube having a light translating screen scanned in lines by an electron beam, a structure of conducting material on the inside face of said tube in substantially the same plane with said screen, said structure being scanned by said electron beam and extending along an edge of and insulated from said screen, and having a multiplicity of conducting elements having a width approximately that of said beam extending toward said screen and respectively aligned with individual ones of said scanning lines.

5. In a cathode ray tube having a fluorescent screen consisting of alternate lines of fluorescent materials fluorescent in different colors, a structure of conducting material on the inside face of said tube in substantially the same plane with said screen, said structure extending along an edge of, and insulated from said screen, and having a multiplicity of conducting elements having a width approximately that of said lines extending toward said screen and respectively aligned with individual ones of said lines of fluorescent materials.

6. An electron beam deflection control system for a color television receiver embodying a kinescope having a luminescent screen including a multiplicity of groups of substantially horizontal strips of material capable respectively of producing light of the different component colors of an image to be reproduced in response to excitation by an electron beam deflected over said screen, said kinescope also having electrode structure adjacent to one edge of said screen to generate registration signals responsive to traversal thereof by said beam and representative of the orientation of said beam with successive groups of said screen strips, said control system comprising, beam-deflecting means adjacent to said electron beam path and energizable to effect registration of said beam with successive groups of said screen strips, means for developing correcting signals from said registration signals, means for energizing said beam-deflecting means by said correcting signals and means including a clamping circuit responsive to said correcting signals for maintaining said correcting signal energization of said beam-deflecting means during each of a succession of horizontal beam deflections over said screen.

7. A cathode ray tube having a fluorescent screen and a structure of electricity conducting material on the inside face thereof, and apparatus for scanning said screen and said structure with an electron beam, said structure comprising a multiplicity of conducting elements located at the side of and in substantially the same plane as said screen and respectively aligned with individual scanning lines of said beam.

8. A cathode ray tube having a fluorescent screen and a structure of electricity conducting material on the inside face thereof, said structure being adjacent one side of said screen and in substantially the same plane therewith and comprising a multiplicity of groups of conducting elements, the corresponding elements of each group being connected to a lead different from leads to which the elements of other groups are connected.

9. In a color television system, a cathode ray tube having a screen comprising lines of fluorescent materials which fluoresce in different colors when scanned by a cathode ray beam, a plurality of conductors of electricity in said tube in substantially the same plane and respectively aligned with individual ones of said lines.

10. In a color television system, a cathode ray tube having a screen of fluorescent material upon the inside face thereof, separated conductors along one side of said screen in substantially the same plane, in alignment with the individual scanning lines of the beam of said tube, beam deflection means to scan said screen and conductors, and means connected to said conductors for producing voltage from current derived therefrom, said voltage being applied to said beam deflection means to cause said beam to return to its correct scanning position when it departs therefrom.

11. In a color television system, a cathode ray tube having a screen of fluorescent material upon the inside face thereof, separated conductors of electricity along one side of said screen in substantially the same plane and extending in the direction in which said screen is scanned and being equal in number to the lines normally scanned by the beam of said tube.

References Cited in the file of this patent

UNITED STATES PATENTS

| | | |
|---|---|---|
| 1,976,400 | Ilberg | Oct. 9, 1934 |
| 2,307,188 | Bedford | Jan. 5, 1943 |
| 2,307,212 | Goldsmith | Jan. 5, 1943 |
| 2,415,059 | Zworykin | Jan. 28, 1947 |
| 2,446,791 | Schroeder | Aug. 10, 1948 |
| 2,461,515 | Bronwell | Feb. 15, 1949 |
| 2,529,485 | Chew | Nov. 14, 1950 |

FOREIGN PATENTS

| | | |
|---|---|---|
| 443,896 | Great Britain | Mar. 10, 1936 |
| 868,403 | France | Sept. 29, 1941 |